Feb. 19, 1929.

F. BRADLEY

GAME

Filed Dec. 17, 1928

1,702,760

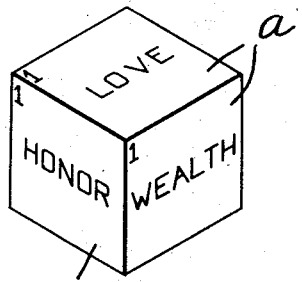

| a | b | c | d | e | f |
|---|---|---|---|---|---|
| 1 LOVE | 2 GROWS | 3 RAPIDLY | 4 THIS FORTNIGHT | 5 FOR YOU AND YOURS | 6 CAT |
| 1 HONOR | 2 INCREASES | 3 SLOWLY | 4 THIS MOON | 5 FOR ONE YOU LOVE | 6 CUP |
| 1 WEALTH | 2 DOUBLES | 3 BY CHANCE | 4 IN TIME | 5 FOR YOU ALONE | 6 CANDLE |
| 1 HAPPINESS | 2 DECLINES | 3 BY SLOW DEGREE | 4 WITHIN THE MONTH | 5 BUT CHANGETH AGAIN | 6 STAR |
| 1 LUCK | 2 COMES TO YOU | 3 THROUGH A FRIEND | 4 TO YOUR GAIN | 5 FORTUNE FAVORS | 6 ALMS |
| 1 HEALTH | 2 CHANGETH | 3 BY TRAVEL | 4 FOR A TIME | 5 TO A FRIEND'S LOSS | 6 FORZ-TYCHE |

Inventor,
Fred Bradley,
By Owen & Owen,
Attorneys

Patented Feb. 19, 1929.

1,702,760

UNITED STATES PATENT OFFICE.

FRED BRADLEY, OF TOLEDO, OHIO.

GAME.

Application filed December 17, 1928. Serial No. 326,442.

This invention relates to a game in which a series of dice are used in determining the supposed fortune or future prospects of a person by whom or for whom the dice are cast. Each of the dice is inscribed on its six faces with various words, phrases or symbols, which, when the dice are cast and arranged in predetermined sequence, convey certain meanings according to the combination of the faces that appear uppermost.

The nature of my invention, the manner in which it may be used, the significance of the inscriptions on the faces of the various dice, and their relations to each other will be more particularly explained in connection with the accompanying drawings, illustrating one embodiment of the same.

In the drawings:

Figure 1 is an isometric view of one of the dice used in the game.

Figure 2 represents a chart or diagrammatic view illustrating an example of the inscriptions which may be borne by the faces of the various dice.

The game is played with a set of dice, usually six in number, each one having, of course, six faces as represented in Figure 2. The dice are serially numbered from one to six and each die bears on each of its faces an Arabic numeral or other symbol representing the ordinal number or sequential position of the die when it is arranged in combination with the others for the purpose stated.

The first die is usually called the prince and, as represented in Figure 1 and in the first column of the chart shown in Figure 2, the various faces of this die, which are indicated by the reference character $a$, are inscribed with certain nouns, such as Love, Honor, Wealth, and the like, representing the various subjects to which fortune usually pertains.

As represented in the second column of the chart shown in Figure 2, each face of the second die, indicated by the reference character $b$, has inscribed thereon a verb, such as Grows, Increases, and the like, with or without modifying words, and these inscriptions are so chosen that any one of them may constitute a predicate for any one of the nouns inscribed on the faces of the first die.

As illustrated in the third column of the chart shown in Figure 2, the third die has inscribed on each of its faces, indicated by the reference character $c$, an adverb or adverbial phrase such as Rapidly, Slowly, or the like. Any one of the inscriptions on the third die may modify any one of the predicates borne by the faces of the second die to indicate the manner in which the fortune is realized.

As represented in the fourth column of the chart shown in Figure 2, each face of the fourth die, indicated by the reference character $d$, bears an inscription representing an adverbial phrase or modifier, which may be combined with any combination which may be turned up on the first three dice to convey an intelligible idea.

As represented in the fifth column of the chart shown in Figure 2, each face of the fifth die, indicated by the reference character $e$, is also inscribed with a phrase which may modify the meaning conveyed by any combination of the first four dice which may chance to turn up.

In playing the game, the first five dice are cast together from the cupped hands or from a dice cup and are then arranged in numerical sequence. The words or phrases on the faces of the various dice are so selected that any possible combination, when arranged in numerical sequence, makes an intelligible sentence pertaining to the fortune of the person by whom or for whom the dice are cast. Since each die has six faces, any one of which may turn up, and since any one of these faces may appear in combination with any one of the faces on any one of the other dice, it follows that the number of different possible combinations is $6^5 = 7776$.

The five dice are cast first and the sixth and last die is cast last and alone. This last die is usually called the Judge or Doomsman. It determines whether the fortune forecast by the first five dice is true or false. Its six faces, indicated by the reference character $f$, are inscribed with words, signs, or symbols, which are to be interpreted according to a predetermined rule. In the embodiment illustrated in the last column of the chart shown in Figure 2, the six faces respectively represent Cat, Cup, Candle, Star, Alms and Forz-Tyche.

According to the preferred rules of the game, if the cat, cup or candle is turned up, the fortune told by the first five dice is false. If the cat appears three times in succession, the person whose fortune is being told must have no more to do with the dice until the clock strikes twelve. If the star is turned up in connection with a favorable fortune, it strengthens and increases the meaning thereof, and when turned up in connection with an unfavorable fortune, it is supposed to lessen the evil foretold. If alms is turned up in connection with a favorable fortune, the fortune will not become effective until alms has been bestowed upon some person. If alms is turned up in connection with an unfavorable fortune, a gift of alms will dispel the evil foretold. The most favorable sign on the last die is Forz-Tyche, and if this is turned up it will strengthen good fortune or dispel bad fortune.

While I have shown and described one embodiment of the invention, and have outlined rules by which the game may be played, it is, of course, obvious that the same may be considerably modified without departing materially from the scope thereof as defined in the appended claims.

What I claim is:

1. A game comprising a set of dice serially numbered, the ordinal number of each die appearing on each face thereof, the faces of all of the dice except the last one of the series being inscribed with words, the words on the uppermost faces when the dice are arranged in sequence always forming an intelligible sentence regardless of what combination is cast, the last die having an inscription on each face denoting, according to which one appears uppermost when the die is cast, whether or to what extent the message conveyed by the preceding dice is to be accepted or rejected as false.

2. A game comprising a set of dice serially numbered, each face of the first die having a noun inscribed thereon, each face of the second die having a predicate inscribed thereon applicable to the inscription on any one of the faces of the first die, each of the remaining dice except the last having an adverbial modifier inscribed on each face and applicable to any combination appearing uppermost on the first two dice, so that the words on the uppermost faces of all the dice except the last, when arranged in sequence, always form an intelligible sentence regardless of what combination is cast, the last die having an inscription on each face denoting, according to which face appears uppermost when the die is cast, whether or to what extent the message conveyed by the other dice is to be accepted or rejected as false.

3. A game comprising a set of dice serially numbered, so that they may be arranged in predetermined sequence after they are cast, the faces of certain of the dice being inscribed with characters having certain meanings, the characters on the uppermost faces, when arranged in sequence, always representing an intelligible connected thought regardless of what combination is cast.

4. A game comprising a set of dice serially numbered, each face of the first die having a noun inscribed thereon to represent the subject of a sentence, each face of the second die having a predicate inscribed thereon applicable to the subject inscribed on any one of the faces of the first die, certain of the remaining dice having an adverbial modifier inscribed on each face and applicable to any combination appearing uppermost on the first two dice, so that the words on the uppermost faces of all the dice, when arranged in sequence, always constitute an intelligible sentence regardless of what combination is cast.

In testimony whereof I have hereunto signed my name to this specification.

FRED BRADLEY.